Dec. 11, 1923.　　　　　　　　　　　　　　　1,477,496
M. R. HUTCHISON
INSECT PROOF PORTAL
Filed Aug. 18, 1923　　　　2 Sheets-Sheet 1
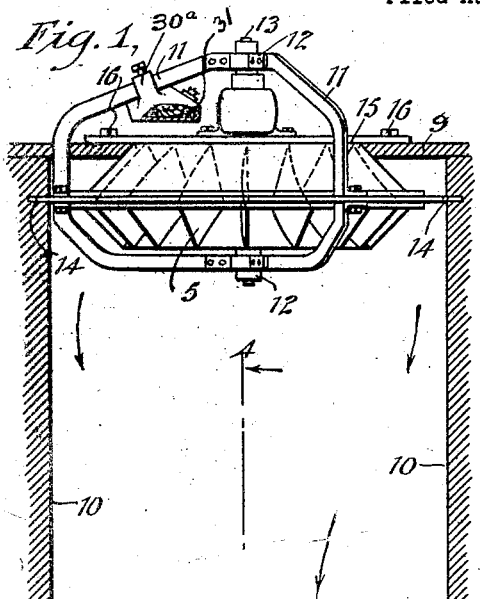
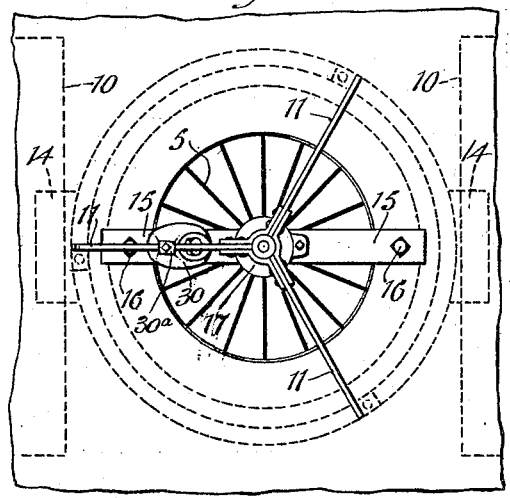
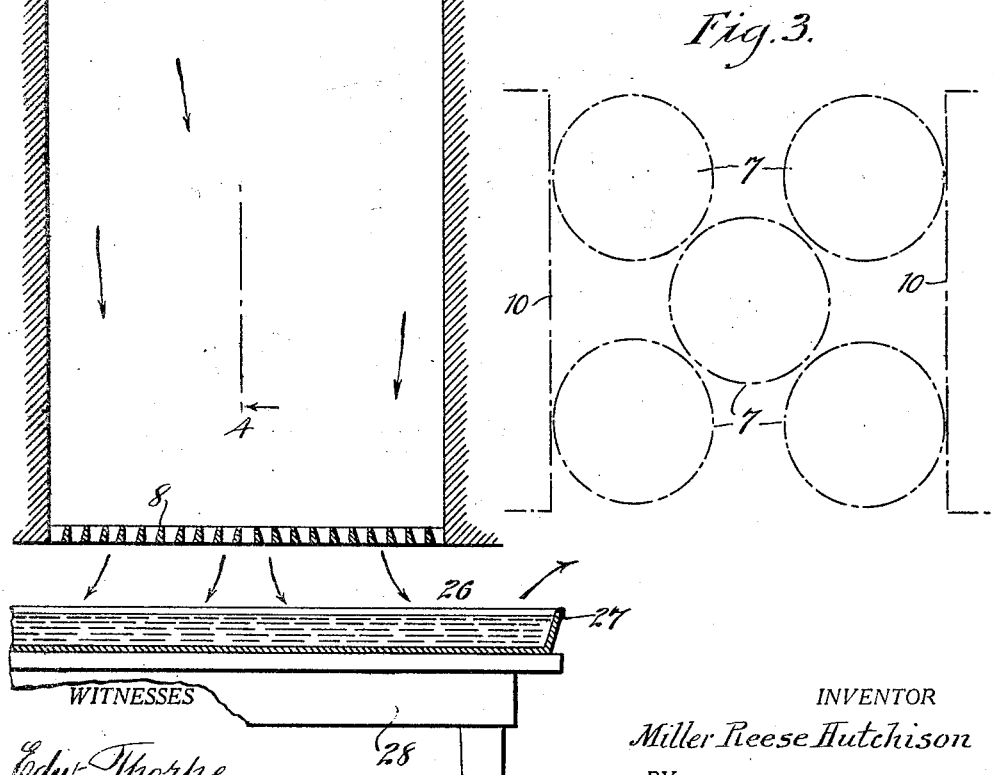
WITNESSES
INVENTOR
Miller Reese Hutchison
BY
ATTORNEYS Patented Dec. 11, 1923.

1,477,496

UNITED STATES PATENT OFFICE.

MILLER REESE HUTCHISON, OF ORANGE, NEW JERSEY.

INSECTPROOF PORTAL.

Application filed August 18, 1923. Serial No. 658,069.

*To all whom it may concern:*

Be it known that I, MILLER REESE HUTCHISON, a citizen of the United States, and a resident of Orange, in the county of Essex and State of New Jersey, have invented a new and Improved Insectproof Portal, of which the following is a full, clear, and exact description.

This invention relates to the art of maintaining an unscreened opening in a building or rather the atmospheric contents thereof, in a condition whereby winged insects are absolutely precluded from passing from the inside to the outside of the building or vice versa by way of such opening; the invention more particularly having in mind the provision of a method of and apparatus for continuously maintaining a constantly moving, completely intangible and invisible barrier means so far as such insects are concerned and yet a means of the kind described offering no appreciable resistance or inconvenience, that is to say, no hindrance whatever, to persons passing back and forth through the opening. Obviously the present invention is of greatest value in providing an insect-proof portal for use with buildings such as dwellings, stores, stables and the like having portals for permitting the free passage of human beings or other creatures while at the same time preventing any possible passage of insects through such portals.

An important object of my invention is to provide an insect-proof portal construction, which may be used with buildings of many different kinds and styles, which necessitates the very simplest of structural alterations in the building, and these alterations only in the vicinity of the portal itself; and, further, a construction which is inexpensive to construct, and which is effective and positive in operation, particularly when used for shops, stores and similar emporiums having certain food stuffs for sale and on display in necessarily exposed positions.

A further object of the invention is to provide a method and construction of the class described, by means of which screen doors, windows and the like customarily employed to prevent the entrance of insects into a building, may be dispensed with, and yet whereby flies or other insects will be positively prevented from passing through the portal, but through which portal, nevertheless, human beings may freely and easily pass.

A further object of the invention is to provide a method and construction of the class described, whereby the flies or other winged insects seeking to pass through the portal are not only baffled as to such aim but are subject to influences and forces tending, if not certain, to entrap and destroy the insects, preferably by forcibly transporting the insects to a lethal and preferably hidden chamber or bath.

A very important object of the invention is to utilize a rapidly moving column of air or other suitable fluid, which essentially differs from the air sheets heretofore proposed, in that the column of the present invention is truly a column, by which is meant a stream of air having a cross section any dimension of which is considerable, as a circular, elliptical, oblongovate or polygonal cross section. Such a column, that is, a column as just defined, I have discovered, especially if established by an air or fluid movement in a certain direction as explained below, is actually effective to attain the results desired, and the results heretofore erroneously thought by me as well as apparently by others working in this art, to be attainable when using a thin sheet-like air blast flowing in the plane of the portal except possibly when associated with a multiplicity of strand-like streamers each anchored at one end but having the opposite end free. Recent actual tests conducted by me in connection with the kinds of wholly or partially invisible insect barriers last described, that is, of the sheet-like air blast type, have convinced me that the same may not always be relied on to attain the objects hoped for; but in these tests I have discovered, or rather demonstrated to my satisfaction, the truth of a theory, that winged insects and particularly flies, when traveling through the air, are unable so to remain in flight when subjected to a down draft or a blast of air or other gas impinging the backs of the insects, providing such blast is of sufficient width in the direction of flight of the insects through the portal to prevent the insects from completely traversing the blast in an interval of time as brief, really to the fraction of a second, as would be required for an insect to pass merely through a thin sheet-like blast. Hence the characteristic columnar blast of the present invention; and from the foregoing it will be clearly understood that the salient or really essential dimensional characteristic of such blast is that it is of considerably greater width than that of a thin sheet-like blast in a direction substantially perpendicular to the plane of the portal, keeping always in mind that most desirably, if not essentially, the lateral dimension of the blast in said plane is always as wide as the portal, and as would naturally follow from what has just been said, such blast is as long as the complete height of the portal; in this connection the invention being preferably carried out, so far as the apparatus thereof is concerned, by providing a portal having jambs or side walls of considerable width transverse to the plane of the portal, thereby to define really a vestibular portal compartment, and by providing a means at the top of the portal, as a downwardly discharging rotary blower fan of the plenum type, for continuously maintaining a downwardly traveling column within the vestibular compartment, and by providing further means at the bottom or floor portion of said compartment for permitting the free passage therethrough and in a downward direction of the lower portion of the column.

Another object of the invention is to provide a method of and apparatus for handling the column at or in the vicinity of the bottom of the portal whereby such insects as enter and become entrapped in the column between the upper and lower limits of the portal will pass with the column from the portal and will be segregated for destruction or delivered lifeless or stupefied into a chamber or trap; whether as a result of the incorporation into such column or the maintenance in such chamber, or both, of an insecticidal gas, vapor or liquid.

With these and other objects in view the invention consists in certain novel principles and features of construction and combinations and arrangements of parts as will be more fully hereinafter described and pointed out in the claims.

In the accompanying drawings,

Figure 1 is a somewhat diagrammatic view, showing a portal construction according to the invention, and particularly adapted to facilitate a carrying out of the method of the invention, such view being a vertical section taken through the portal in the plane having to be traversed by a person passing through the portal;

Fig. 2 is a fragmentary view in top plan and showing a portion of the roof structure of the vestibular compartment constituting the portal;

Fig. 3 is a strictly diagrammatic view, somewhat similar to Fig. 2 and illustrating a modification of the column creating means at the top of the portal.

Figure 4:
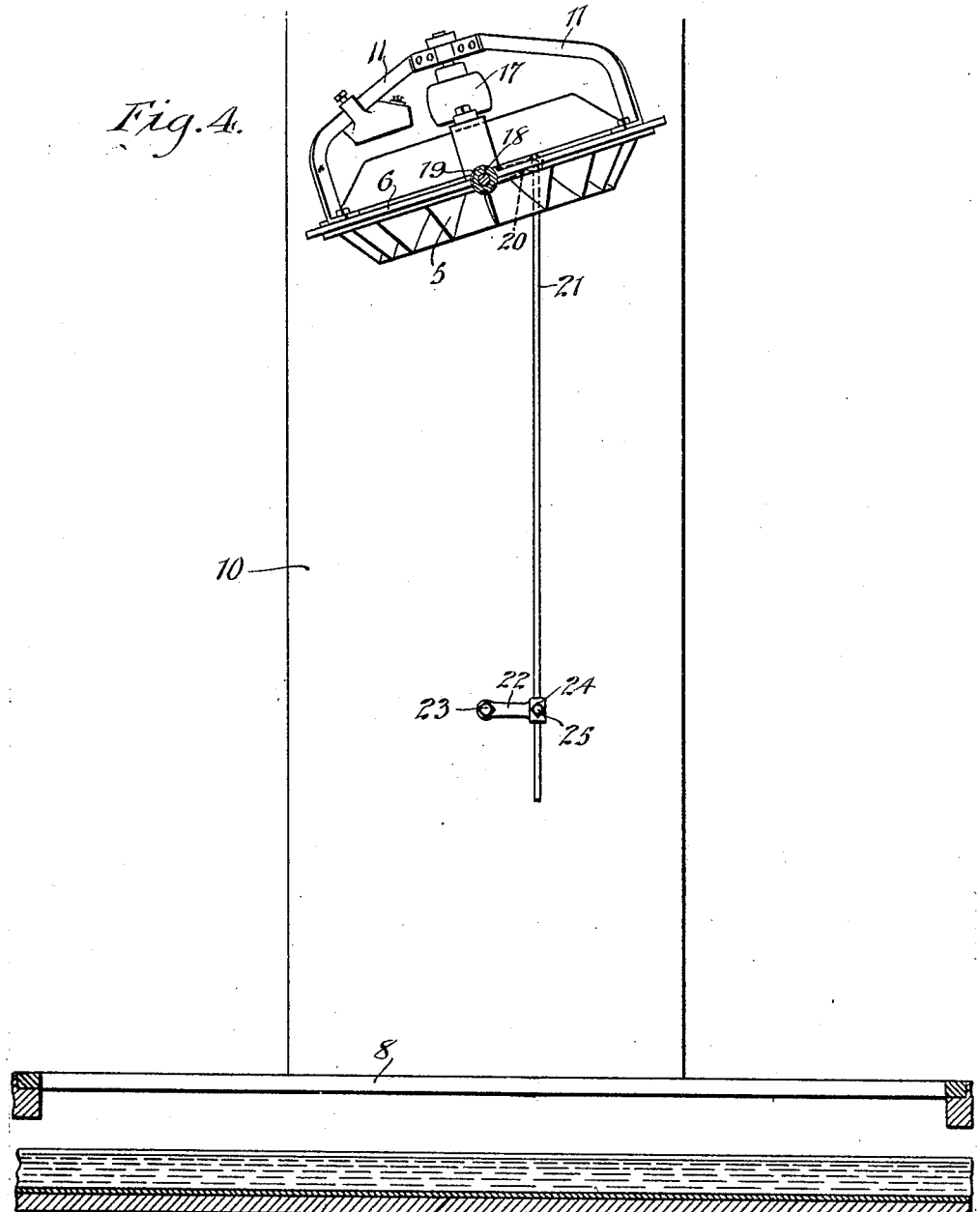
Fig. 4 is a vertical section, taken as though on the line 4—4 of Fig. 1, but showing still another modification of the means last mentioned.

Before proceeding to a more detailed explanation of my invention it should be understood that, while the same is particularly useful in connection with doorways of buildings, it can likewise be employed with windows, ventilating openings, and, in fact, any other portal opening of any building. The invention, particularly useful in connection with establishments, such as stores, through the doorways of which many individuals pass to-and-fro, obviates the necessity of having the usual swinging screen doors, which must be opened and closed each time that an individual passes through the doorway, which swinging doors nevertheless, as is well known, permit flies and other insects to enter each time such doors are swung open.

The method of the present invention will be more clearly, if not entirely, understood from a description of the details of construction of the apparatus shown in the drawings.

The portals shown whether equipped with the rotary blower fan 5 of Figures 1 and 2 or with the axially adjustable similar fan 6 of Figure 4, or with a plurality of such fans as indicated at 7 in Figure 3, is always preferably of such a construction that the portal includes, in addition to its floor construction 8 and roof construction 9 a pair of opposite jambs or side wall constructions 10 of sufficient horizontal dimensions in the direction of ingress and egress through the portal, as best shown in Figures 2 and 4, to constitute the portal a vestibular compartment as above indicated. The mutually facing wall surfaces of jambs 10 may be made plane and parallel as disclosed in Figure 2 or may be laterally concave or given specially shaped surfaces adapted best to co-act with the fan 5 or equivalent in maintaining the columnar downwardly discharged blast from the last-mentioned means, within the confines of the vestibular-compartment portal as desired.

Referring to the fan 5 of Figures 1 and 2 this fan is of any conventional construction, and is mounted in a cage or skeleton frame 11 providing bearings at 12 for the fan shaft 13 carrying fixedly the various blades or vanes of the fan; and such cage also carries flanged horizontal extensions at opposite sides whereby the cage and fan may be anchored to or braced against the jambs 10 in the manner indicated. In the present case, the fan means is equipped with a transverse suspending bar 15, through a suitable opening in which the fan shaft may freely rotate, and adapted to be bolted as at 16 to the roof of the structure of the portal. This fan shaft has fixed thereon a pulley 17 for taking a suitable power driven belt (not shown).

It will be understood that the fan means just described, when driven at the requisite speed, is adapted to deliver a single substantially cylindrical and downward blast according to the invention; this blast always transversing a fixed columnar zone.

The possible modification of the blast discharging means indicated in Figure 3, is merely illustrative of the possibility of carrying out the invention by simultaneously delivering, within the confines of the portal, that is, between the inner and outer limits of jambs 10, a plurality of smaller but similar blasts, each created by one of a plurality of rotary downwardly discharging blower fans 7, the fans being so horizontally overlappingly arranged that the plurality of columnar air blasts delivered therefrom combine to present from top to bottom of the portal an air blast barrier having portions of different air pressure yet no way presenting even a very sinuous path through which a fly or other insect may pass without being entrapped in one of the air columns and borne down helplessly toward the floor construction of the portal.

Referring to Figure 4, still another modification of a blower fan type of air column discharging means is disclosed, and of such a type as to indicate various other possibilities of the invention. Here a single rotary fan, as in the case of Figure 1, is illustratively employed; but the fan of Figure 4 is mounted in its cage solely by the fan shaft bearings of the cage, and the cage itself is mounted in the vicinity of the roof of the portal solely by means of horizontal trunnions 18 carried by the cage at opposite sides and set in trunnion bearings 19 suitably fixedly secured to the portal structure. The purpose of this construction is to permit the fan cage to be fractionally rotated on its trunnions, thus to variously incline the fan shaft from the vertical, in either direction, so as to vary the columnar blast in either direction from the vertical to meet the various atmospheric and barometric conditions inside and outside the building having the portal. The fan 6 is thus adjusted, and for the purposes just indicated, by means manually controllable at a point below the fan and within or near the portal. In the present case, such means includes an arm 20 fixed on one of the trunnions 18, a pendant control rod 21 the upper end of which is pivoted to the free end of arm 20, and a rod locking device including an arm 22 pivoted at 23 to the portal construction and carrying a transverse sleeve 24 at its outer end through which the rod 21 is slidable, this sleeve portion of arm 22, in combination with a clamping thumb screw 25 carried also by the arm, constituting a means for locking fan 6 however inclined according to an upward or downward movement of rod 21.

The floor 8 of the portal, as shown best in Figure 1 is preferably constructed as a metallic or other grating and as shown best in Figure 4, such grating is preferably considerably longer than the depth of the portal in the direction of ingress and egress; a construction of particular value when an adjustable fan or equivalent like the fan 6 of Figure 4 is employed.

Below this grating and consequently out of sight, a receiving and dissipating means for the columnar air blast is provided, as well as a means for receiving and collecting the insects entrapped by the blast and thereby swept out of the portal. The blast receiving and dissipating means may constitute a chamber, such as that indicated at 26, and such chamber may be a part of or the entire cellar or basement of the building. The means for receiving and accumulating the insects passing through the openings in the grating forming the floor 8 includes here a tray 27 set a suitable distance below the grating on a table 28 or the like and containing a liquid bath which may be water but is preferably an insecticide. If said liquid is water, or indeed any liquid, means also may be provided, not shown, for injecting an insecticidal component in the columnar air blast downwardly delivered from the top of the portal; as, for instance, the provision of a wicker container 30 for a liquid insecticide 31, and located just above the vanes of the fan means, said container carrying a sleeve-bracket 30ª taking one of the radial elements of cage or frame 11.

The method of the present invention should be entirely clear from the foregoing, and so the specification will not be burdened with a detailed description thereof since such description would be substantially a paraphrase of the method claim or claims attached. And as to all the claims attached, it will of course be understood that variations may be freely and widely resorted to within the scope of said claims.

I claim:

1. The method of maintaining a portal continuously open to the passage of human beings while continuously closed to the passage of flying insects, which method involves maintaining a continuously moving air barrier while impregnating such barrier with an insect disabling component.

2. In building construction, a combination of a wall having an opening, and means formed by parts of said opening, and also including a rotary fan at the upper part of said opening, for maintaining a downwardly flowing column of air below said fan, said fan being mounted for adjustment to vary its angle of rotation to discharge said column at various deviations from the vertical, and means for holding said column to a substantially straight line descent.

MILLER REESE HUTCHISON.